Oct. 3, 1939.　　　A. J. SACKETT　　　2,174,896
AERATING APPARATUS
Filed Nov. 23, 1936
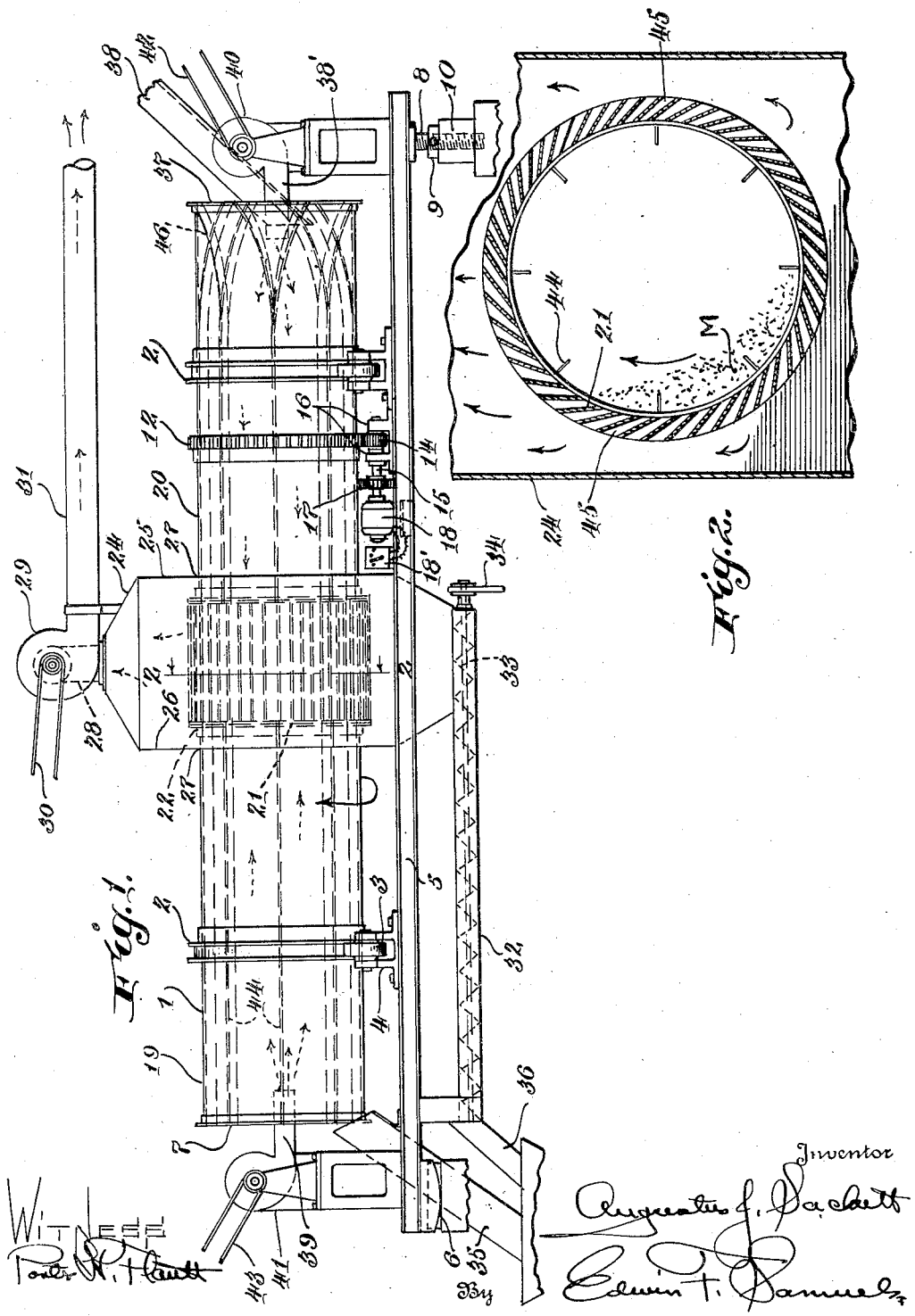

Patented Oct. 3, 1939

2,174,896

UNITED STATES PATENT OFFICE 2,174,896

AERATING APPARATUS

Augustus J. Sackett, Anne Arundel County, Md.

Application November 23, 1936, Serial No. 112,206

1 Claim. (Cl. 34—6)

The invention relates to a machine for cooling and aerating fertilizer and similar materials.

Though it is capable of being otherwise utilized the machine of the invention is particularly adapted for use in cooling and aerating fertilizers immediately after mixing. Such a mixing process is described in my U. S. Patent No. 1,960,030. In accordance to this mixing process, anhydrous ammonia which is of a vaporous or gaseous nature at atmospheric pressure, it is mixed in a mechanical mixer continuously with comminuted phosphate rock which is first acidulated. A very important function of this previous apparatus is that it preserves the desirable granular structure of the product. This process, however, has as an unavoidable incident, the generation of a considerable amount of heat, and if the mixed material is permitted to remain in a mass or pile it deteriorates and loses its granulous structure.

The purpose of the present apparatus is to aerate and cool the product as it comes from the previous machine, or after it has been deposited thereby, preventing such deterioration and particularly the loss of the granular form of the fertilizer particles.

The machine of the invention provides means for agitating and advancing through a container the fertilizer material which is to be cooled and aerated, at the same time providing a continuous draft of air to which all the fertilizer particles are presented, the air draft being released from the machine and preferably separated from the finer fertilizer particles which it holds in suspension as it is discharged, the process being continuous and the fertilizer being continuously supplied to and discharged from the machine, and continuously and uniformly treated so that the fertilizer materials are discharged therefrom in a continuous stream of completely cooled and aerated particles, the term cool being used in the sense that the particles are reduced substantially to a predetermined mean temperature at which deterioration is permanently arrested, or nearly so.

In the accompanying drawing I have illustrated a continuously operating fertilizer cooling and aerating apparatus embodying the features of my invention in the preferred form, though the features and details illustrated are capable of considerable variation without departure from the underlying principles of the invention.

In the drawing:

Figure 1 is a side elevation of the apparatus.

Figure 2 is a section on the line 2—2, Figure 1.

Referring to the drawing by numericals, each of which is used to indicate the same or similar parts in the different figures, the construction shown comprises a drum 1 which may be of any suitable cross section the drum being preferably cylindrical. This drum is encircled by a plurality of grooved bearing members 2 which are spaced apart in a manner suitable to support the drum, these bearing members 2 are engaged from beneath by rollers 3, which rollers support the drum for rotation substantially about its longitudinal axis which is to the best advantage near the horizontal being preferably deflected from the horizontal, and inclined downwardly in the direction of feed at a suitable angle. For this purpose the supporting rollers 3 are mounted, in brackets 4, upon a tiltable platform 5. This platform 5 in the preferred form of the invention shown has a rocking support, 6 near the discharge end, 7 of the drum and a vertical screw, 8 supporting it at the other end. This screw 8 bears at its upper end against the bottom of the platform or frame 5 and is engaged intermediately by a rotatable nut 9, the lower end of the screw 8 sliding in a suitable guide support 10 on the top of which the nut 9 rests. The manner of rocking the platform or frame 5 to give the desired adjustment of the incline of the drum with the horizontal at any suitable angle will be understood from the description and illustration.

Any suitable means may be provided for rotating the drum at any desired speed and at variable speeds, the most satisfactory speed, according to present knowledge, is seventeen revolutions per minute. The drawing shows a ring gear 12 encircling the drum and secured thereto. This ring gear 12 is engaged and driven by a pinion, 14, mounted on a shaft, 15, which rotates in suitable bearings, 16, on the platform or frame, 5. The shaft, 15, and pinion, 14, are driven through reducing gearing 17 by an electric motor or from any other suitable source of power 18. This motor is shown as mounted on the platform 5 and provided with a rheostat or controller 18' for starting, stopping and changing the speed of the motor.

The drum as shown consists of two imperforate members or sections 19—20 shown in the form of cylinders, the same being arranged in substantial alinement and placed with their adjacent ends spaced apart and secured to the ends of a central perforated cylinder 21. In the form shown the perforated cylinder 21 has secured thereto rings 22 of angular cross section which encircle the adjacent ends of the drum sections 19 and 20, securing them to the perforated cylinder and to each other. Thus the drum has a perforated central zone with imperforate or substantially imperforate end sections.

In the form of invention shown the perforated cylinder 21 is enclosed within an air discharge member 24 which may also serve the function of a separator, this is apertured as to its opposite sides 25 and 26 at 27, said apertures closely encircling the end portions of the drum sections 19, 20 which rotate together with the perforated section 21, all three sections as a unit. This member 24 as shown is provided with an air discharge passage 28 at the top to which in the form of the invention shown an air discharge suction fan 29 is connected, the same being driven by a belt 30 and being connected to a discharge pipe 31. At the bottom the air discharge member may be connected to a pipe or passage 32 containing a screw or other suitable conveyor 33 operated by a belt 34. This serves to combine with the treated material being discharged, any fine particles which may emerge with the air from the drum and be dropped in the chamber 24 which as shown provides a dead air space and may in addition to other functions, serve the function of a settling chamber in which the particles carried out by the air draft are precipitated before the air is thrown off by the suction fan.

The discharge end 7 of the drum is open at least as to the peripheral portion thereof to discharge the treated material M into and through the discharge chute 35 which it will be noted discharges into a receptacle 35' together with chute 36 from the dust conveyor pipe, 32. The intake end of the drum, 37, it being understood that both ends referred to are the axial ends of the drum, is open at the center to receive the feed chute, 38.

At or near centers of both ends, 7, and 37, the drum has suitable openings for the admission of air draft pipes 38' at the intake end, and 39, at the discharge end. These pipes in the form of the invention shown are connected to blowers 40 and 41 at the intake and discharge ends respectively, or to any suitable means for projecting an air draft at suitable speed and in suitable quantities into the drum and to the best advantage at the opposite ends. These blowers 40 and 41 in the form of the invention shown are operated by belts 42 and 43, it being obvious that any suitable or available source of power may be utilized. The blowers 40 and 41 are shown as supported on the table or frame 5 to move or rock with the drum.

The drum is shown as provided with longitudinal agitating vanes or plates 44. These as shown are spaced about the circumference of members 19 and 20 and extend inwardly in a radial direction from the inner wall of the drum, the vanes being relatively narrow in this direction but elongated in the direction of the axis of the drum extending continuously or otherwise, substantially its entire length except as to the perforated member 21 which, as shown, need not be provided with these vanes.

At the intake end of the cylinder the blades or ribs 44 are shown as helically inclined at 46 so that they give the materials as they enter, an impetus in the direction of feed which is from right to left in Figure 1, the feed of the material beyond this point being maintained as to the right end portion of the drum, i. e., section 20, by the incline and by the action of the air draft and the rumbling action of the drum. The material is fed through the left hand portion of the drum by gravity due to the incline and by the rumbling action, the air draft at this point being opposite to the feed and not effective for this purpose. The forward motion of the material, due to the action of the helical portions 46 of the vanes 44, is also effective to this namely to advance the material.

It is of interest regarding the perforated portion or member 21 that the perforated walls are preferably composed of vanes 45 as shown in Figure 2, said vanes being spaced apart and inclined outwardly and forwardly in the direction of rotation so that the lag of the solid particles relative to the speed of the drum tends to maintain them within the drum and causes them to be carried forward with the feed instead of being thrown out with the discharged air. Not only motor 18, blowers 40 and 41, drum 1 but also chutes 35 and 36 and conveyor pipe 33, are preferably supported on the frame or platform 5.

In the operation of the machine of the invention the material M is fed continuously to the drum 1 at the right hand end by way of the feed chute 38, the blowers 40 and 41 and the suction fan 29 likewise being continuously operated, the drum also being in continuous rotation in which it is actuated by the motor 18 or from some other suitable source of power. The mean speed of rotation at normal atmospheric temperatures is about 17 revolutions per minute but this is variable by controller 18'. The materials after their first feeding impulse from the intake end 37 climb the left hand side of the drum as seen in Figure 2, being dropped from one blade or rib 44 to the other to the left and maintained in continuous agitation, in contact with the air draft, each particle thus being fully and completely air washed and aerated so that any chemical or physical action due to heating is instantaneously and permanently arrested.

The incline of the cylinder in the direction of its axis and downwardly in the direction of the feed which is determined by the adjusting screw 8 is regulated in its relation to the air draft to control the length of time, i. e., the period during which the material is treated in the machine, this being the period required for each particle to pass through the machine, this at least approaches uniformity.

To some degree the draft from the blower 40 tends to accelerate the advance of the material and the draft from the blower 41 has some retarding effect but due to the uniform agitation of the particles and the incline, the respective particles remain in the machine and are treated for a substantially uniform period. The provision of the blowers at the ends gives a substantially uniform draft through the drum section without regard to the effect of the rotation of the perforated member in discharging the air at the center.

The air discharge chamber 24, in addition to confining the air and providing a suction discharge, serves as a settling chamber to accumulate any of the solid materials which may be discharged at this point, the same being combined with the main discharge through the chute 35, being led thereon by the pipe 32 and conveyor 33. The method described in connection with the operation of the machine is an aerating method regarded as having inventive properties independently of the machine.

In addition to the advantages of the operation described, the machine has the further advantage of an extremely short vertical dimension making it satisfactory for use in a plant having low head room.

It is also of advantage that any desired degree of aeration of the materials can be obtained not only by changing the incline, changing the speed of rotation, and the rate of feed, but by changing the speed of the blowers. It should also be understood in this connection that any quantity of material fed in by the feed chute and advanced by the helical arrangement of the vanes at 46 will with the proper incline or even with the axis arranged horizontally, be caused to advance or flow through the machine, being discharged at substantially the same rate at the discharge end 7. The variable incline helps materially in regulating the rate of discharge, effecting a satisfactory operation of the machine. The air draft is substantially uniform throughout the transverse cross section of the drum.

I have thus described specifically and in detail a single preferred embodiment of my invention, including a machine and aerating method, in order that the manner of constructing, applying, operating and using the invention may be fully understood. However, the specific terms herein are used descriptively rather than in a limiting sense, the scope of the invention being defined in the claim.

What I claim as new and desire to secure by Letters Patent is:

A machine for aerating fertilizing materials and the like, comprising a single cylindrical elongated drum through which said materials are conveyed, a frame for supporting said drum in a substantially horizontal position, means associated with said frame for raising vertically one end of the said drum, means for continually rotating the said drum about its horizontal axis, said drum having an imperforated portion extending inwardly from each end thereof to a point adjacent the center section of the drum and a perforated portion located between the said imperforated portions, said perforated portion comprising a plurality of vanes extending horizontally of said drum and arranged to provide openings therebetween, said vanes being rigidly secured and positioned about the outer surface of said drum and disposed outwardly and forwardly in the direction of the rotation of the drum to reduce the tendency to discharge the materials through the said perforations, a stationary housing about said drum inclosing the perforated portion, said housing having a settling chamber adjacent the bottom thereof for collecting dust particles passing through said perforations, a conveyor extending parallel with said drum and leading from said chamber to the discharge end of the drum for conveying the said dust particles from the said chamber, an exhaust fan connected with the upper portion of said housing for exhausting air from the said drum, a blower located at each end of said drum for creating an air blast within the ends of the drum toward the perforated center portion, means for feeding material into the adjustable end of said drum and means at the opposite end thereof for discharging said material after it has passed through said drum, continuous ribs extending inwardly from the side walls and from one end of said drum to the other over the said perforated portion for agitating and conveying the material along the drum from the feeding end to the discharge end.

AUGUSTUS J. SACKETT.